United States Patent
Xiao et al.

(10) Patent No.: US 9,418,036 B2
(45) Date of Patent: Aug. 16, 2016

(54) DATA TERMINAL WITH A CONNECTION STRUCTURE OF USB INTERFACE

(71) Applicant: Huawei Device Co., Ltd., Shenzhen (CN)

(72) Inventors: Jian Xiao, Shenzhen (CN); Bin Zeng, Shenzhen (CN)

(73) Assignee: Huawei Device Co., Ltd., Shenzhen, Guangdong ( * ) Notice: Subject to any disclaimer, the term of this patent is extended or adjusted under 35 U.S.C. 154(b) by 464 days.

(21) Appl. No.: 14/088,675

(22) Filed: Nov. 25, 2013

(65) Prior Publication Data

US 2014/0082246 A1 Mar. 20, 2014

Related U.S. Application Data

(63) Continuation of application No. PCT/CN2012/080612, filed on Aug. 27, 2012.

(30) Foreign Application Priority Data

Oct. 26, 2011 (CN) .......................... 2011 1 0329309

(51) Int. Cl.
*H01R 13/44* (2006.01)
*G06F 13/40* (2006.01)
*G06K 19/077* (2006.01)

(52) U.S. Cl.
CPC ........ *G06F 13/409* (2013.01); *G06K 19/07732* (2013.01)

(58) Field of Classification Search
CPC ...... H01R 13/44; H01R 35/04; H01R 23/025; H01R 23/7073; H01R 23/02
See application file for complete search history.

(56) References Cited

U.S. PATENT DOCUMENTS 6,217,350 B1 * 4/2001 Johnson ................. H01R 24/62
361/737
6,475,003 B2 * 11/2002 Jones ..................... H01R 13/22
439/131

(Continued)

FOREIGN PATENT DOCUMENTS

CN 2817112 Y 9/2006
CN 201490457 U 5/2010

(Continued)

OTHER PUBLICATIONS

Foreign Communication From A Counterpart Application, PCT Application No. PCT/CN2012/080612, English Translation of Chinese Search Report dated Dec. 13, 2012, 3 pages.

(Continued)

*Primary Examiner* — Gary Paumen
(74) *Attorney, Agent, or Firm* — Conley Rose, P.C.; Grant Rodolph; Nicholas K. Beaulieu

(57) ABSTRACT

The present invention provides a data terminal with a connection structure of a universal serial bus (USB) interface. The structure includes: a USB interface, a guide rail element, an elastic element, and a limit element; a protrusion is disposed on at least one side of the USB interface; the guide rail element includes two vertical faces disposed opposite each other; the USB interface is located in an accommodating space formed by the two vertical faces; a guide rail is disposed on each vertical face in a hollow manner; the protrusion on the USB interface extends out of the accommodating space from the guide rail; and in the two vertical faces, a connection terminal is disposed on an outer side of at least a first vertical face.

20 Claims, 3 Drawing Sheets

(56) References Cited

U.S. PATENT DOCUMENTS

| | | | | |
|---|---|---|---|---|
| 7,307,849 B2* | 12/2007 | Ho | H05K 5/0278 | 361/737 |
| 7,361,032 B2* | 4/2008 | Loftus | H01R 13/4538 | 439/131 |
| 7,869,219 B2* | 1/2011 | Ma | G11C 11/5621 | 361/737 |
| 7,887,342 B1* | 2/2011 | Yu | G06F 3/03545 | 361/737 |
| 8,014,130 B1* | 9/2011 | Nguyen | H01R 13/447 | 361/600 |
| 8,029,303 B2* | 10/2011 | Chiang | H01R 13/60 | 439/131 |
| 8,043,099 B1 | 10/2011 | Ni et al. | | |
| 8,345,417 B2* | 1/2013 | Lo | H05K 5/0278 | 361/679.31 |
| 2008/0220636 A1* | 9/2008 | Champion | H01R 13/665 | 439/131 |
| 2011/0147036 A1* | 6/2011 | Cheng | G06F 1/1656 | 174/59 |
| 2014/0004728 A1* | 1/2014 | Zhou | H01R 13/635 | 439/131 |
| 2014/0308830 A1* | 10/2014 | Tseng | H04Q 1/026 | 439/131 |

FOREIGN PATENT DOCUMENTS

| | | |
|---|---|---|
| CN | 102521638 A | 6/2012 |
| EP | 1703782 A1 | 9/2006 |

OTHER PUBLICATIONS

Foreign Communication From A Counterpart Application, PCT Application No. PCT/CN2012/080612, English Translation of Chinese Written Opinion dated Dec. 13, 2012, 5 pages.

* cited by examiner

DATA TERMINAL WITH A CONNECTION STRUCTURE OF USB INTERFACE

CROSS-REFERENCE TO RELATED APPLICATIONS

This application is a continuation of International Application No. PCT/CN2012/080612, filed on Aug. 27, 2012, which claims priority to Chinese Patent Application No. 201110329309.1, filed on Oct. 26, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of communications technologies, and in particular, to a data terminal with a connection structure of a universal serial bus (USB) interface.

BACKGROUND

A data terminal, also known as a Wireless Internet Terminal, may be connected to a wireless wide area network. The data terminal functions as a modem but is small in size and portable. The data terminal is mainly applied to user equipment such as notebook computers or desktop computers, and is connected with user equipment via a USB interface thereof In the prior art, the USB interface of the data terminal is usually a direct plug-in type USB interface. In application, such a direct plug-in type USB interface needs a user to remove a USB cap covered on the USB interface, so that the USB interface is exposed and plugged into the user equipment.

However, in the prior art, after the direct plug-in type USB interface is used for a period of time, the fitting between the USB cap and the USB interface is likely to become loose, and as a result, the USB cap may be missing.

SUMMARY

Embodiments of the present invention provide a connection structure of a USB interface, and a data terminal, so as to solve the problem in the prior art that a USB cap of a direct plug-in type USB is likely to become loose and be missing.

An embodiment of the present invention provides a connection structure of a USB interface, including: a USB interface, a guide rail element, an elastic element, and a limit element, where a protrusion is provided on at least one side of the USB interface; the guide rail element includes two vertical faces disposed opposite each other; the USB interface is located in an accommodating space formed by the two vertical faces; a guide rail is disposed on each vertical face in a hollow manner; the protrusion on the USB interface extends out of the accommodating space from the guide rail; in the two vertical faces, a connection terminal is disposed on an outer side of at least a first vertical face; an end of the elastic element is connected to the connection terminal on the outer side of the first vertical face, and another end is connected to the protrusion extending out of the first vertical face; the limit element is arranged on the two vertical faces, and includes a connection portion and a limit portion; the connection portion includes a support frame and an elasticity supply element; the elasticity supply element is connected between the guide rail element and the support frame, and is configured to supply elasticity for vertical movement of the support frame relative to the guide rail element; and the limit portion is configured to limit the protrusion.

An embodiment of the present invention further provides a data terminal, where a connection structure of a USB interface of the data terminal is described above.

Embodiments of the present invention provide a connection structure of a USB interface, and a data terminal, the connection structure includes a USB interface, a guide rail element, an elastic element, and a limit element. The position of the protrusion of the USB interface is changed by pressing the limit element, thereby switching the USB interface between two positions, hence solving the problem in the prior art that the USB cap of the direct plug-in type USB is likely to come off and be missing, thereby facilitating usage and improving the reliability.

BRIEF DESCRIPTION OF THE DRAWINGS

To illustrate the technical solutions according to the embodiments of the present invention more clearly, the accompanying drawings for describing the embodiments are given briefly below. The accompanying drawings in the following description are some embodiments of the present invention, and persons of ordinary skill in the art may derive other drawings from the accompanying drawings without creative efforts.

DETAILED DESCRIPTION

In order to make the objectives, technical solutions, and advantages of the present invention more comprehensible, the technical solutions according to embodiments of the present invention are clearly and described in the following with reference to the accompanying drawings. The embodiments in the following description are merely a part rather than all of the embodiments of the present invention. All other embodiments obtained by persons of ordinary skill in the art based on the embodiment of the present invention without creative efforts shall fall within the protection scope of the present invention.

Figure 1:
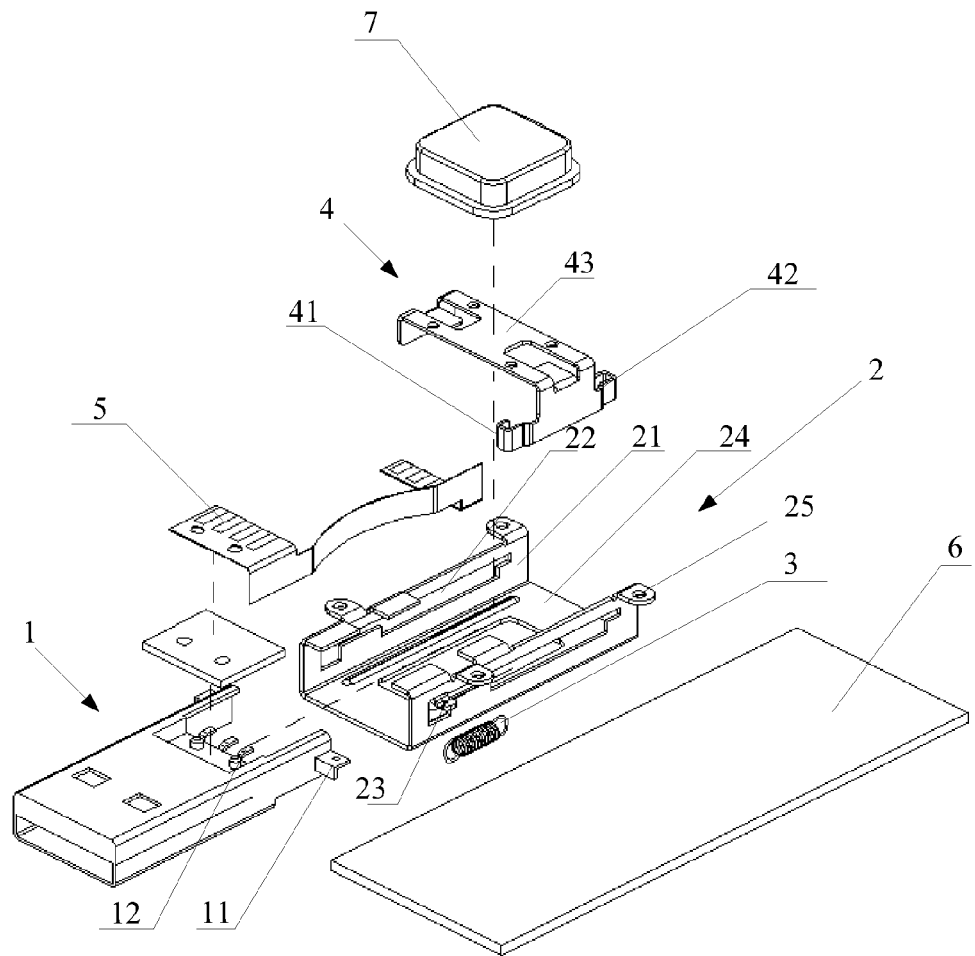
FIG. 1 is an exploded diagram of a connection structure of a USB interface according to an embodiment of the present invention.

FIG. 1 is an exploded diagram of a connection structure of a USB interface according to an embodiment of the present invention. As shown in FIG. 1, the connection structure includes: a USB interface 1, a guide rail element 2, an elastic element 3, and a limit element 4. A protrusion 11 is disposed on at least one side of the USB interface 1. In FIG. 1, that protrusions 11 are disposed on both sides of the USB interface 1 is taken as an example; however, the protection scope of the present invention is not limited thereto. The guide rail element 2 includes two vertical faces 21 disposed opposite each other. The USB interface 1 may be located in an accommodating space formed by the two vertical faces 21. A guide rail 22 is disposed on each vertical face 21 in a hollow manner. The protrusion 11 on the USB interface 1 extends out of the accommodating space from the guide rail 22. A connection terminal 23 is disposed on an outer side of at least one vertical face 21; the vertical face 21 with the connection terminal 23 on the outer side is referred to as a first vertical face. A side of the vertical face 21 facing the accommodating space is referred to as an inner side of the vertical face, and a side away from the accommodating space is referred to as the outer side of the vertical face. An end of the elastic element 3 is connected to the connection terminal 23 on the outer side of the first vertical face, and another end is connected to the protrusion 11 extending out of the first vertical face. The limit element 4 is arranged on the two vertical faces 21, and includes a connection portion and a limit portion. The connection portion includes a support frame 43 and an elasticity supply element. The support frame 43 is a main structure of the connection portion. The elasticity supply element is configured to supply elasticity for vertical movement of the support frame 43 relative to the vertical face 21. The limit portion is configured to limit the protrusion 11.

In an implementation manner, in the connection structure of the USB interface according to the embodiment of the present invention, the guide rail element 2 may further include a bottom face 24 connected to the bottom of the two vertical faces 21. The bottom face 24 is configured to support the two vertical faces 21, and may be integrally formed with the two vertical faces 21. Compared with the two separate vertical faces, the integrally formed guide rail element 2 with the bottom face 24 is more stable in structure. The guide rail element 2 may be made of a metal material.

In an implementation manner, in the connection structure of the USB interface according to the embodiment of the present invention, the connection portion and the limit portion of the limit element 4 may be integrally formed. In this embodiment, lap joint pieces 44 are taken as an example to describe the elasticity supply element. Two lap joint pieces 44 are in a lap joint with the two vertical faces 21 respectively, so as to establish a connection between the limit element 4 and the vertical faces 21. The support frame 43 is crossed over the two vertical faces 21, and is higher than an upper end of the two vertical faces 21. The elasticity supply element may also be a spring. An end of the spring is connected to the support frame 43, and another end is connected to the bottom face 24. Preferably, springs are uniformly distributed between the support frame 43 and the bottom face 24, so as to ensure the stable movement of the support frame 43.

Figure 2:
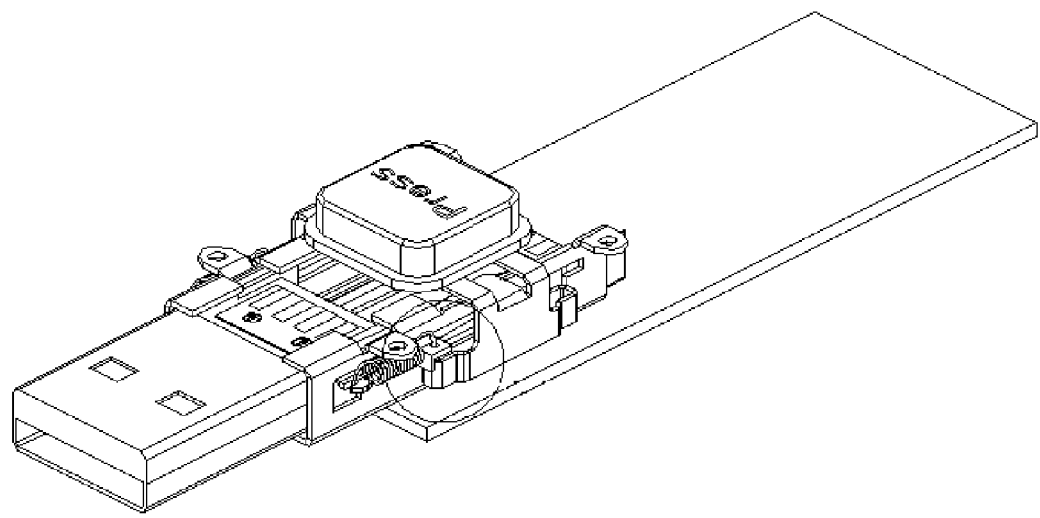
FIG. 2 is a schematic diagram of a connection structure of a USB interface according to an embodiment of the present invention.
Figure 3:
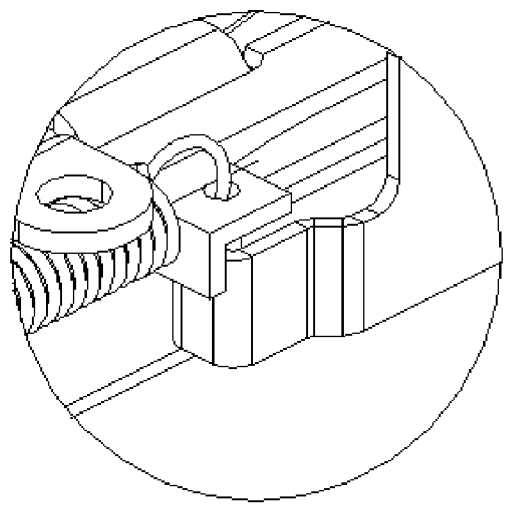
FIG. 3 is a partial enlarged schematic diagram of a ring in FIG. 2.
Figure 4:
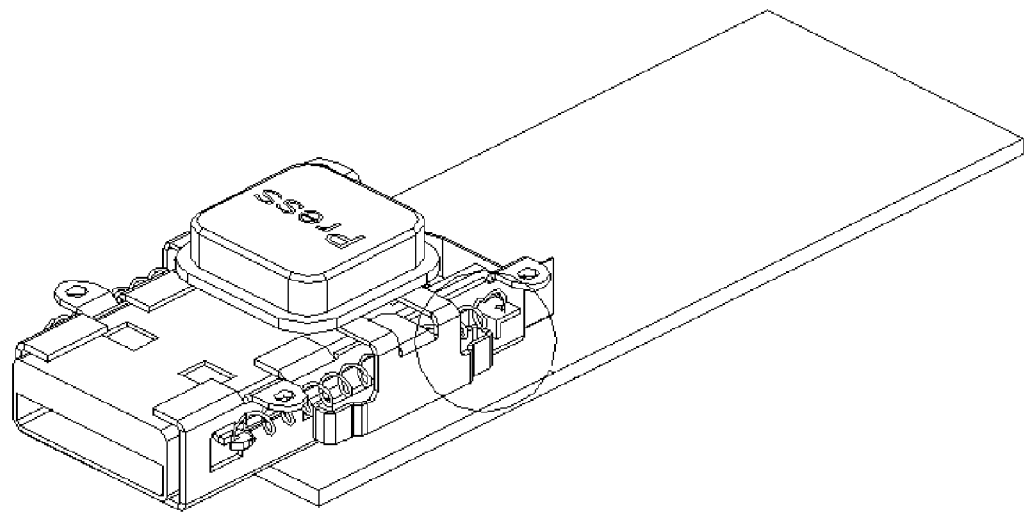
FIG. 4 is a schematic diagram of a connection structure of a USB interface according to an embodiment of the present invention.
Figure 5:
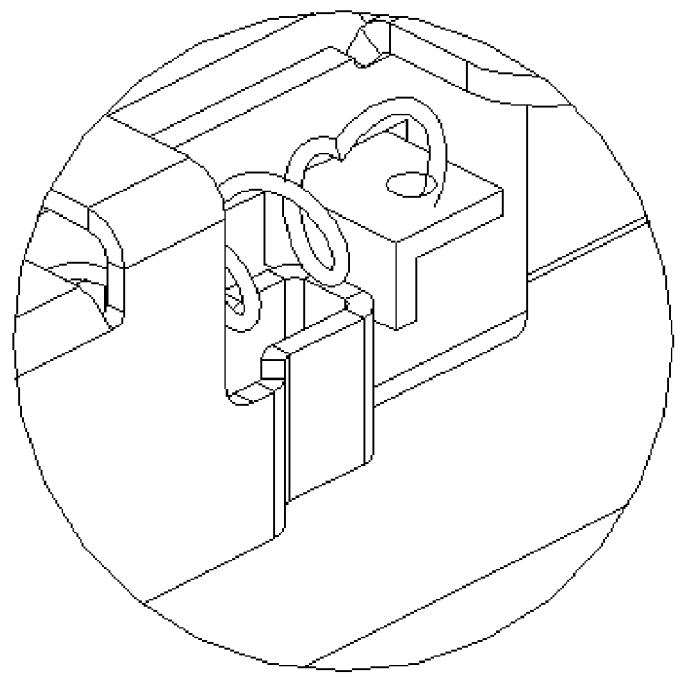
FIG. 5 is a partial enlarged schematic diagram of a ring in FIG. 4.

The limit portion is located at a side of the elastic element 3, and includes two positioning terminals 41 and 42 along an extending direction of the guide rail 22. The positioning terminal 41 close to the connection terminal 23 is configured to fix the protrusion 11 at a first position, for example, a position where the USB interface extends out of the accommodating space (referring to the schematic diagram of a connection structure of a USB interface according to an embodiment of the present invention as shown in FIG. 2, where FIG. 3 is a partial enlarged schematic diagram of a ring in FIG. 2). The positioning terminal 42 away from the connection terminal 23 is configured to fix the protrusion 11 at a second position, for example, a position where the USB interface retreats to the accommodating space (referring to the schematic diagram of a connection structure of a USB interface according to an embodiment of the present invention as shown in FIG. 4, where FIG. 5 is a partial enlarged schematic diagram of a ring in FIG. 4).

Further, a press element 7 may further be disposed on the support frame 43. The press element 7 may be configured to: when being pressed by a user, enable the limit portion to move downwards along the support frame 43, so that the limit portion is separated from the protrusion 11, and the USB interface 1 may slide along the extending direction of the guide rails 22 on the two vertical faces 21. The press element 7 is preferably a press button.

In an implementation manner, in the connection structure of the USB interface 1 according to the embodiment of the present invention, a threaded hole 25 for establishing a connection with a USB device housing is further provided on the guide rail element 2; more than one threaded hole 25 may be provided, and the number of the threaded holes 25 is not specifically defined as long as a firm connection may be established between the guide rail element 2 and the USB device housing.

Further, a wiring terminal 12 is further disposed on the USB interface 1. In this case, the connection structure of the USB interface 1 may further include a flexible circuit board 5 and a printed circuit board 6. An end of the flexible circuit board 5 is connected to the wiring terminal 12 of the USB interface 1, and another end is connected to the printed circuit board 6. The printed circuit board 6 is located under the guide rail element 2.

In an implementation manner, in the connection structure of the USB interface 1 according to the embodiment of the present invention, a length of the guide rail 22 is adaptive to a length of the USB interface 1.

In an implementation manner, in the connection structure of the USB interface 1 according to the embodiment of the present invention, the elastic element 3 may be a spring or an elastic strip.

An embodiment of the present invention further provides a data terminal; a connection structure of a USB interface 1 of the data terminal is described in the above embodiment.

The use of the data terminal according to the embodiment of the present invention is described below with reference to FIG. 2 to FIG. 5. Referring to FIG. 4 and FIG. 5, in an initial state, the elastic element 3 is stretched; the positioning terminal 42 contacts a side of the protrusion 11 close to the USB interface 1 and fixes the USB interface 1 within the data terminal. When a user presses the press element 7, the support frame 43 of the limit element 4 is stressed, forcing the limit portion to move downwards to release the protrusion 11. Under the effect of the elasticity of the elastic element 3, the protrusion 11 moves forward along the guide rail 22, and the entire USB interface 1 extends out of the data terminal due to the release of the elastic stress of the elastic element 3 and the inertia effect. At this time, if the user releases the press element 7, the limit portion of the limit element 4 moves upwards again. As shown in FIG. 2 and FIG. 3, at this time, the positioning terminal 42 contacts a side of the protrusion 11 away from the USB interface 1, resisting the backward movement of the protrusion 11 and maintaining the state that the USB interface 1 extends out of the data terminal. At this time, the elastic element 3 is in a compressed state, and the user may plug the data terminal into a user equipment for use. When the user does not need to use the data terminal, the user removes the data terminal from the user equipment, and presses the press element 7. At this time, the support frame 43 of the limit element 4 is stressed, forcing the limit portion to move downwards to release the protrusion 11. Under the effect of the elasticity of the elastic element 3, the protrusion 11 moves backwards along the guide rail 22, and the entire USB interface 1 retreats to the inside of the data terminal due to the release of the elastic stress of the elastic element 3 and the inertia effect. In this case, if the user releases the press element 7, the limit portion of the limit element 4 moves upwards again and is restored to the state shown in FIG. 4 and FIG. 5.

The connection structure of a USB interface according to the embodiment of the present invention includes a USB interface, a guide rail element, an elastic element, and a limit element. The position of the protrusion of the USB interface is changed by pressing the limit element, thereby switching the USB interface between two positions, hence solving the problem in the prior art that the USB cap of the direct plug-in type USB is likely to come off and be missing, thereby facilitating usage and improving the reliability.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof without departing from the spirit and scope of the technical solution of the embodiments of the present invention.

What is claimed is:

1. A data terminal comprising:
 a connection structure of a universal serial bus (USB) interface,
 wherein the connection structure comprises a USB interface, a guide rail element, an elastic element, and a limit element,
 wherein a protrusion is provided on at least one side of the USB interface,
 wherein the guide rail element comprises two vertical faces disposed opposite each other,
 wherein the USB interface is located in an accommodating space formed by the two vertical faces,
 wherein a guide rail is disposed on each vertical face in a hollow manner,
 wherein the protrusion on the USB interface extends out of the accommodating space from the guide rail,
 wherein in the two vertical faces, a connection terminal is disposed on an outer side of at least a first vertical face,
 wherein an end of the elastic element is connected to the connection terminal on the outer side of the first vertical face,
 wherein another end of the elastic element is connected to the protrusion extending out of the first vertical face,
 wherein the limit element is arranged on the two vertical faces and comprises a connection portion and a limit portion,
 wherein the connection portion comprises a support frame and an elasticity supply element,
 wherein the elasticity supply element is connected between the guide rail element and the support frame,
 wherein the elasticity supply element is configured to supply elasticity for vertical movement of the support frame relative to the guide rail element, and
 wherein the limit portion is configured to limit the protrusion.

2. The data terminal according to claim 1, wherein the guide rail element further comprises a bottom face at the bottom of the two vertical faces, and wherein the bottom face is configured to support the two vertical faces.

3. The data terminal according to claim 2, wherein the limit portion comprises two positioning terminals located at a side of the elastic element and along an extending direction of the guide rails on the vertical faces, wherein a positioning terminal close to the connection terminal is configured to fix the protrusion at a first position, and wherein a positioning terminal away from the connection terminal is configured to fix the protrusion at a second position.

4. The data terminal according to claim 2, wherein the elasticity supply element is at least two lap joint pieces, wherein the two lap joint pieces are overlapped on the two vertical faces respectively to establish a connection with the vertical faces, and wherein the support frame is crossed over the two vertical faces and is higher than an upper end of the two vertical faces.

5. The data terminal according to claim 2, wherein the elasticity supply element is a spring, wherein an end of the spring is connected to the support frame, and wherein another end of the spring is connected to the bottom face.

6. The data terminal according to claim 2, wherein a press element is further disposed on the support frame, and wherein the press element is configured to enable the limit portion to move downwards such that the limit portion is separated from the protrusion when the limit portion is pressed by a user.

7. The data terminal according to claim 6, wherein the press element is a button.

8. The data terminal according to claim 2, wherein a threaded hole for establishing a connection with a USB device housing is further provided on the guide rail element.

9. The data terminal according to claim 2, wherein a wiring terminal is further disposed on the USB interface, wherein the structure further comprises a flexible circuit board and a printed circuit board, wherein an end of the flexible circuit board is connected to the wiring terminal, wherein another end is connected to the printed circuit board, and wherein the printed circuit board is located under the guide rail element.

10. The data terminal according to claim 2, wherein the elastic element is a spring or an elastic strip.

11. A connection structure of a universal serial bus (USB) interface, comprising:
 a USB interface;
 a guide rail element coupled to the USB interface;
 an elastic element coupled to the guide rail element; and
 a limit element,
 wherein a protrusion is provided on at least one side of the USB interface,
 wherein the guide rail element comprises two vertical faces disposed opposite each other,
 wherein the USB interface is located in an accommodating space formed by the two vertical faces,
 wherein a guide rail is disposed on each vertical face in a hollow manner,
 wherein the protrusion on the USB interface extends out of the accommodating space from the guide rail,
 wherein in the two vertical faces, a connection terminal is disposed on an outer side of at least a first vertical face,
 wherein an end of the elastic element is connected to the connection terminal on the outer side of the first vertical face,
 wherein another end of the elastic element is connected to the protrusion extending out of the first vertical face,
 wherein the limit element is arranged on the two vertical faces and comprises a connection portion and a limit portion,
 wherein the connection portion comprises a support frame and an elasticity supply element, wherein the elasticity supply element is connected between the guide rail element and the support frame, wherein the elasticity supply element is configured to supply elasticity for vertical movement of the support frame relative to the guide rail element, and wherein the limit portion is configured to limit the protrusion.

12. The connection structure according to claim 11, wherein the guide rail element further comprises a bottom face at the bottom of the two vertical faces, and wherein the bottom face is configured to support the two vertical faces.

13. The connection structure according to claim 12, wherein the limit portion comprises two positioning terminals located at a side of the elastic element and along an extending direction of the guide rails on the vertical faces, wherein a positioning terminal close to the connection terminal is configured to fix the protrusion at a first position, and wherein a positioning terminal away from the connection terminal is configured to fix the protrusion at a second position.

14. The connection structure according to claim 12, wherein the elasticity supply element is at least two lap joint pieces, wherein the two lap joint pieces are overlapped on the two vertical faces respectively to establish a connection with the vertical faces, and wherein the support frame is crossed over the two vertical faces and is higher than an upper end of the two vertical faces.

15. The connection structure according to claim 12, wherein the elasticity supply element is a spring, wherein an end of the spring is connected to the support frame, and wherein another end of the spring is connected to the bottom face.

16. The connection structure according to claim 12, wherein a press element is further disposed on the support frame, and wherein the press element is configured to enable the limit portion to move downwards such that the limit portion is separated from the protrusion when the limit portion is pressed by a user.

17. The connection structure according to claim 16, wherein the press element is a button.

18. The connection structure according to claim 12, wherein a threaded hole for establishing a connection with a USB device housing is further provided on the guide rail element.

19. The connection structure according to claim 12, wherein a wiring terminal is further disposed on the USB interface, wherein the structure further comprises a flexible circuit board and a printed circuit board, wherein an end of the flexible circuit board is connected to the wiring terminal, wherein another end is connected to the printed circuit board, and wherein the printed circuit board is located under the guide rail element.

20. The connection structure according to claim 12, wherein the elastic element is a spring or an elastic strip.

* * * * *